Nov. 28, 1961    F. B. STENCEL    3,010,685
POWER ACTUATED PARACHUTES
Filed Jan. 6, 1960    9 Sheets-Sheet 1

FIG. 1

INVENTOR.
FRED B. STENCEL
BY
*D C Laylance*
ATTORNEY

Nov. 28, 1961  F. B. STENCEL  3,010,685
POWER ACTUATED PARACHUTES
Filed Jan. 6, 1960  9 Sheets-Sheet 2

INVENTOR.
FRED B. STENCEL
BY

ATTORNEY

Nov. 28, 1961   F. B. STENCEL   3,010,685
POWER ACTUATED PARACHUTES
Filed Jan. 6, 1960   9 Sheets-Sheet 3

INVENTOR.
FRED B. STENCEL
BY
ATTORNEY

Nov. 28, 1961 F. B. STENCEL 3,010,685
POWER ACTUATED PARACHUTES
Filed Jan. 6, 1960 9 Sheets-Sheet 8

INVENTOR.
FRED B. STENCEL
BY
*ATTORNEY*

United States Patent Office 3,010,685
Patented Nov. 28, 1961

3,010,685
POWER ACTUATED PARACHUTES
Fred B. Stencel, Asheville, N.C., assignor to Stencel Aero Engineering Corporation, Asheville, N.C., a corporation of North Carolina
Filed Jan. 6, 1960, Ser. No. 738
14 Claims. (Cl. 244—147)

This invention relates to parachute apparatus and particularly to parachute apparatus of the general type disclosed, for example, in my copending application Serial Number 718,362, filed February 28, 1958, and now patent Number 2,957,664, issued October 25, 1960, and involving power means for accomplishing rapid projection and deployment.

As discussed in detail in the aforementioned copending application, parachute apparatus of this general type have heretofore been made in such fashion that the parachute canopy forms part of a projected assembly which can be projected rapidly away from the load to be recovered and the projected assembly also includes deployment means, brought into action when the assembly has reached a predetermined point in its projected flight, for very quickly deploying the parachute canopy. Parachute apparatus of this type find particular use in connection with the recovery of personnel and other loads under low-speed, low-altitude conditions such that there is insufficient time for normal operation of a conventional parachute.

While automatically operated power-projected, power-deployed parachute apparatus of the type referred to in the aforementioned application have proved highly successful for many applications, there has as yet been no practical way proposed to make such a device which could be used under high-speed conditions as well as low speed conditions. The provision of a parachute useful under both of these conditions obviously involves a severe problem because the basic requirements for satisfactory operation under high-speed conditions are, in large measure, directly opposite to the requirements for successful operation under low-speed conditions. Considering "low-speed conditions" as those in which the load to be recovered has a very low, and often zero, air speed, successful operation here requires that the parachute canopy be fully deployed in the very shortest time possible. Considering "high-speed conditions" as those where the load to be recovered has an air speed of at least several hundred miles per hour, it will be obvious that the requirement under such conditions is for a delayed deployment of the canopy, since substantially instantaneous full deployment of the canopy would result in severe shock and, in all probability, destruction of the parachute.

A general object of the present invention is to provide parachute apparatus capable of successful use under both high air speed and low air speed conditions.

Another object is to provide an automatically actuated parachute apparatus, involving power means normally effective to deploy the parachute canopy very rapidly, and wherein operation of the deployment means can be modified, either at will or automatically in response to air speed conditions, to avoid rapid deployment of the parachute canopy.

A further object is to provide a parachute apparatus capable of successfully recovering a load, such as the pilot, from an aircraft which may be operated at both very low air speeds, as in the case of hovering flight or a vertical takeoff, and at high air speeds.

When the term "projection" is employed herein, it is employed to denote the rapid travel of a portion of the parachute apparatus away from the load to be recovered, prior to release and deployment of the canopy, in order to accomplish prompt extension or "paying out" of the suspension lines. When the term "deployment" is employed herein, it is used to denote the act of converting the parachute canopy from folded condition to a condition in which the canopy is effectively unfurled or spread out for load-supporting operation.

In order that the manner in which the foregoing and other objects are achieved in accordance with the present invention can be understood in detail, reference is had to the accompanying drawings, which form a part of this specification, and wherein.

Typical application

Figure 1:
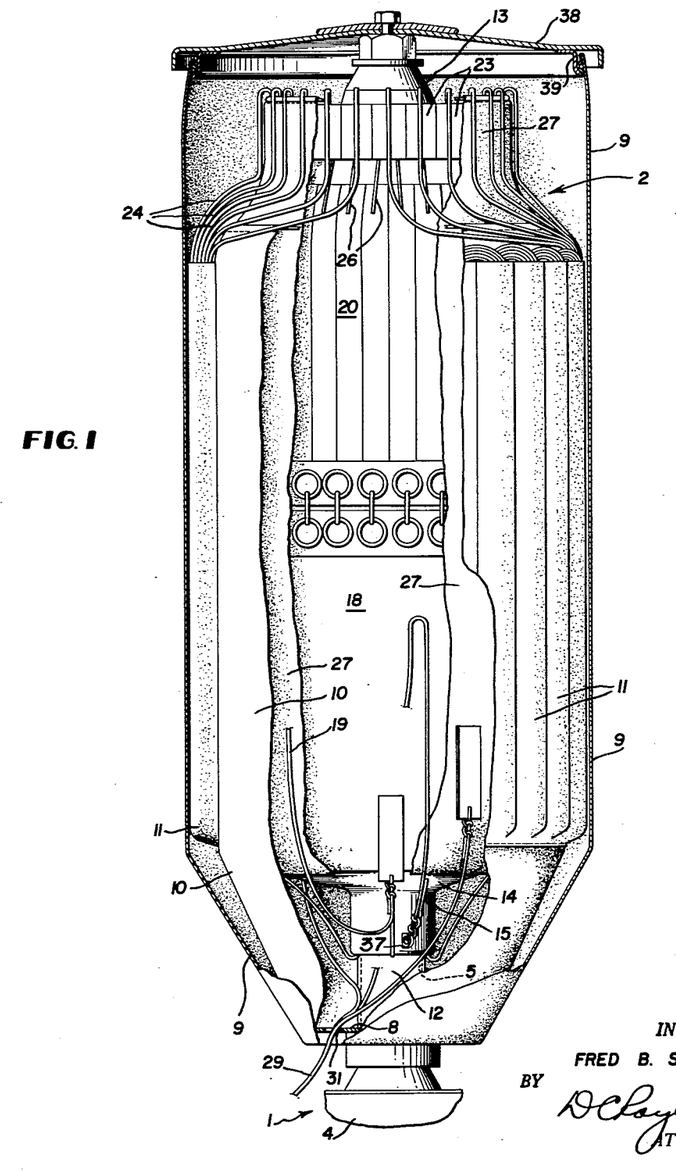
FIG. 1 is a view, partly in longitudinal section and partly in elevation, illustrating a parachute apparatus constructed in accordance with one embodiment of the invention.
Figure 2:
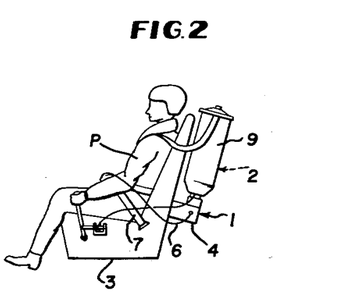
FIG. 2 is an elevational view, reduced in scale, illustrating the parachute apparatus of FIG. 1 as applied to the problem of recovery of a person in flight.

FIGS. 1 and 2 illustrate a typical application of one embodiment of the invention to recovery of a person, such as the pilot P, from an aircraft capable of both hovering and high-speed flight. The parachute apparatus of this embodiment includes a mount and projection unit, indicated generally at 1, FIG. 2, and a projected assembly, indicated generally at 2, FIG. 1, the assembly 2 being carried by unit 1 and unit 1 being mounted on the back of seat 3.

In view of the nature of the aircraft, it is obvious that it may be necessary to recover pilot P either at a time when the aircraft is hovering near the ground at substantially zero air speed or at a time when the aircraft is in high-speed flight at a substantial altitude. In the first case, the low air speed and low altitude would not allow time for a conventional parachute to open by free fall and it is accordingly desirable to project the parachute canopy away from the pilot, until the suspension lines are substantially fully extended, and then promptly deploy the canopy to its load-supporting condition. In the second case, due to the high air speed, rapid projection and deployment of the parachute canopy is obviously undesirable and it is necessary to operate the parachute in a more conventional fashion, with the canopy being allowed to deploy by "filling" with air.

It will be realized by those skilled in the art that, depending upon the specific nature of the aircraft involved, the seat 3 can be an ejection seat or a fixed seat.

Mount and projection unit, FIGS. 1–8

The mount and projection unit 1 can be constructed in any suitable fashion, details thereof forming no part of the present invention. A particularly useful construction employing explosive projection is disclosed in my aforementioned Patent Number 2,957,664, and my copending application Serial Number 718,364, filed February 28, 1958, and now Patent Number 2,965,337, issued December 28, 1960. Broadly, unit 1 includes a housing 4, serving both to enclose parts of the unit and to secure the unit to the seat 3, a projection tube 5, FIG. 1, extending upwardly from housing 4, and explosive means (not shown) operative to generate, upon explosion of its charge, high gas pressures within tube 5, the explosive means being triggered by means of a control wire 6, FIG. 2, extending to the release means for the pilot's seat belt 7, so that the pilot can release his seat belt and trigger projection of the parachute simultaneously.

Immediately adjacent the top of housing 4, tube 5 has secured thereto a retaining plate 8 to which is secured, in any suitable fashion, the bottom of an outer bag 9. Also secured to retaining plate 8 is a line storage sleeve 10 provided with a plurality of longitudinally extending storage pockets 11, the top portion of sleeve 10 being open.

Projected assembly, FIGS. 1–8

Figure 6:
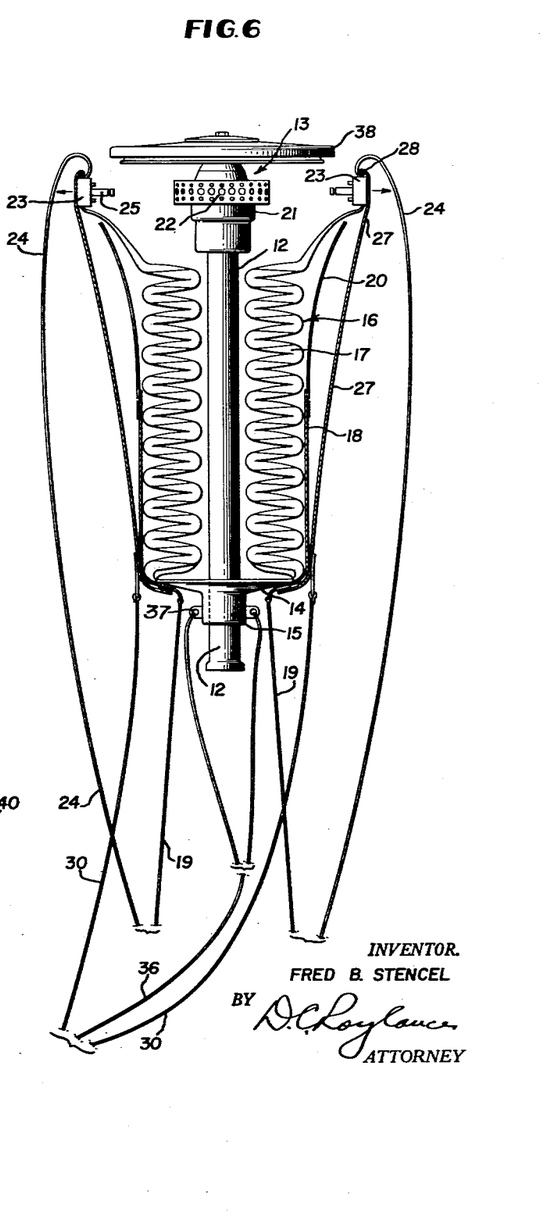
Figure 7:
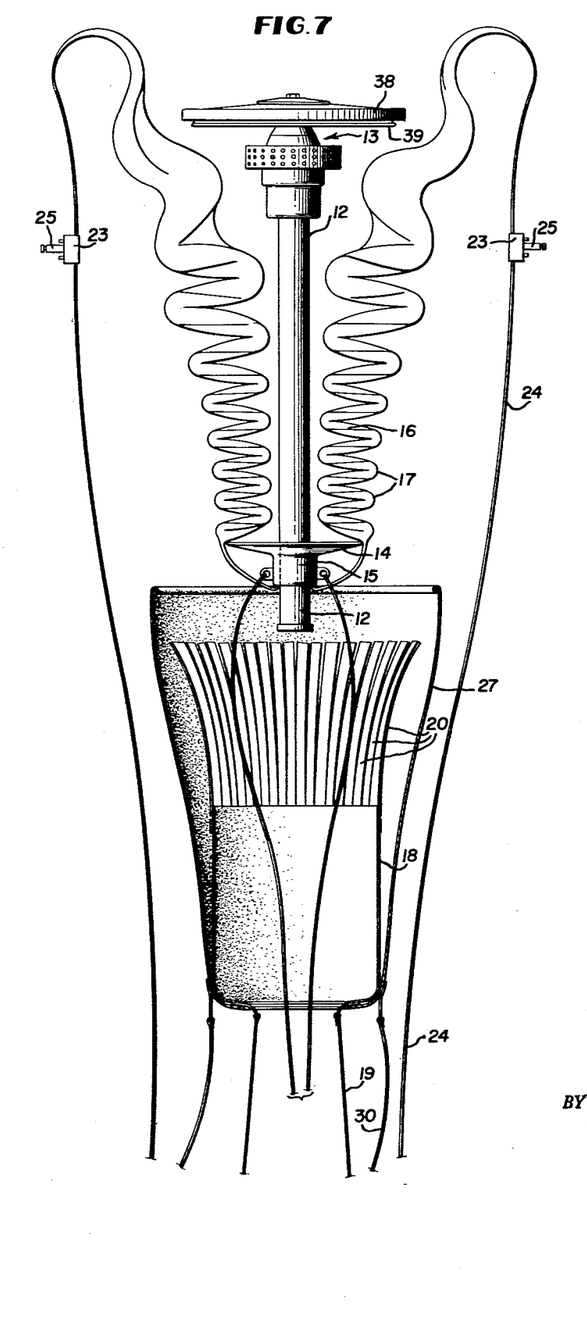

The projected assembly 2 includes an elongated tube 12, best seen in FIG. 6, of such size and shape as to be capable of being telescoped over projection tube 5. In effect, the tube 12 is a projectile adapted to be projected from tube 5 as a result of ignition of the explosive projection charge. Tube 12 serves to support and carry the other elements of assembly 2.

Since tube 12 has a normal flight attitude when projected, it can be considered as having a leading end and a trailing end. Mounted on the leading end of tube 12 is an explosively actuated deployment device, indicated generally at 13. Mounted on tube 12 adjacent the trailing end thereof is a circular retaining plate 14 lying in a plane at right angles to the tube, the plate being provided with a cylindrical projection 15 embracing the tube.

The parachute canopy 16 is secured at its apex to plate 14, the body of the canopy being arranged about tube 12 in folded relation in such fashion that the periphery of the canopy is located at the leading end of the tube and the parachute canopy extends between the leading end of the tube and plate 14 in the form of a series of generally toroidal folds 17. Advantageously, the canopy is folded in the manner disclosed in my copending application Serial Number 581,764, filed April 30, 1956, now Patent Number 2,936,138, issued May 10, 1960.

The folded canopy is enclosed and retained by a canopy bag 18. Bag 18 has a bottom opening and the portion of the fabric making up the bag adjacent such opening extends over the bottom surface of plate 14. A plurality of arresting lines 19, FIG. 1, are attached to the canopy bag near the bottom thereof. The top portion of bag 18 is made up of a plurality of tape-like fabric strips 20.

Figure 17:
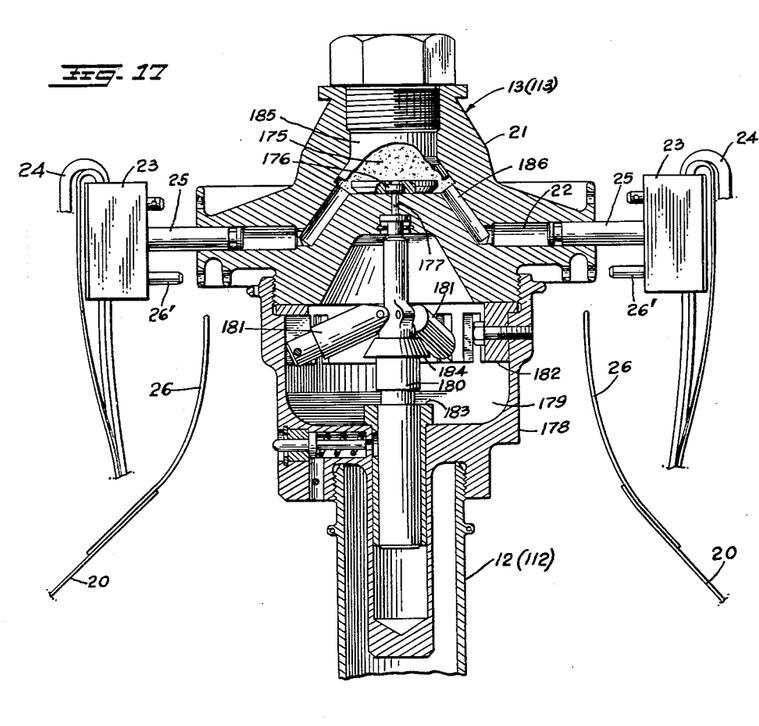
FIG. 17 is a vertical sectional view of the deployment device employed in the apparatus of FIGS. 1–16, on enlarged scale and with some parts shown in elevation.

Deployment device 13, described in detail hereinafter with reference to FIG. 17, comprises a housing 21 defining an explosion chamber and provided with a plurality of bores 22, FIG. 6, disposed radially with respect to the longitudinal axis of tube 12. Housing 21 encloses an explosive charge and mechanism for igniting the charge at a predetermined point in the projected flight of assembly 2. As will be clear from FIG. 6, the deployment means also includes a plurality of deployment projectiles 23 each attached to a different one of the suspension lines 24 adjacent the periphery of the parachute canopy. Each projectile 23 includes a cylindrical projection 25, FIG. 6, dimensioned to fit snugly within one of the radial bores 22. Before firing of the deployment means, projections 25 of the projectiles 23 are disposed in bores 22, so that the parts have the relation seen in FIG. 1. Each strip 20 is provided at its free tip with a loop 26, FIG. 1, each loop 26 being disposed about a suitable projection 26' on a different one of the projectiles 23. Thus, as will be clear from FIG. 1, fabric strips 20 are held in positions to complete the top portion of the canopy bag when projectiles 23 are disposed with their projections 25 in bores 22. On the other hand, as will be clear from FIG. 6, the loops 26 are freed when projectiles 23 are fired radially outward, so that the top or mouth of the canopy bag is thus opened to allow withdrawal and deployment of the canopy 16 as the projectiles 23 continue their flight.

Deployment device 13 can be constructed advantageously in accordance with my copending application Serial Number 718,363, filed February 28, 1958, now patent Number 2,953,333, issued September 20, 1960, and advantageously includes an inertia-operated firing device, as described hereinafter with reference to FIG. 17, which device is brought into play upon deceleration of projected assembly 2, such deceleration resulting, as will be apparent from later description herein, from the action of the arresting lines 19.

Embracing the canopy bag 18 is a deployment-preventing member 27 in the nature of a flexible sleeve. As will be apparent from FIGS. 6 and 7, member 27 is longer than bag 18, the bottom portion of member 27 extending beneath the lower surface of plate 14. At its opposite end, member 27 embraces the circular series of projectiles 23 and is retained in place by a draw string indicated at 28, FIG. 6. Deployment-preventing member 27 is connected to a stripping line 29 via a plurality of short lines 30 connected to member 27 adjacent the bottom thereof, as will be clear from FIGS. 3 and 6.

Suspension lines 24 and arresting lines 19 are folded and stored in pockets 11 of line storage sleeve 10, it being understood that the line storage sleeve 10 embraces the projected assembly, before projection thereof, and remains with the mounting and projection unit 1 after the assembly 2 is projected, the suspension lines and arresting lines paying out from pockets 11 during flight of the projected assembly.

Stripping line 29, on the other hand, depends from within line storage sleeve 10 via an opening 31, FIG. 1, in retainer plate 8 and extends to a releasable connection, indicated generally at 32, FIG. 2, on seat 3. Thus, the free end of stripping line 29 can be provided with a loop normally embracing the portion of a slidable pin 33 disposed between two suitably apertured guide members 34 through which pin 33 freely extends. Pin 33 is pivoted to a handle 35 so that the pilot, by moving the handle, can withdraw the pin from the guide members, so releasing stripping line 29.

It will be understood that, due to the attachment between the apex of canopy 16 and plate 14, the plate 14, projectile tube 12 and deployment device 13 remain connected to the parachute canopy after deployment thereof. Since the assembly 2 is projected at a substantial speed and since elements 12, 13 and 14 have a material weight, there is a tendency for the inertia of these elements to "cone" the canopy during deployment. To avoid this, an anti-coning line 36 is connected between stripping line 29 and plate 14. Thus, one end of the anti-coning line can be attached to the juncture between line 29 and lines 30 and the other end can be divided into two portions, each attached to a lug 37 on portion 15 of plate 14. The length of line 36 is chosen to be such that, assuming stripping line 29 to be retained by connection 32, tube 12 and the elements which it carries will be stopped before undesirable coning occurs. Before projection of assembly 2, line 36 is stored between deployment-preventing member 27 and line storage sleeve 10.

As will be clear from FIG. 1, a top closure plate 38 is mounted on deployment device 13 and has a dependent annular skirt embraced by the top edge portion of outer bag 9, a good but releasable connection being maintained between such top edge portion and skirt 39, as by a draw string. At their ends opposite the parachute canopy, the suspension lines 24 are attached to straps 40, FIG. 3, straps 40 extending through suitable apertures in top closure plate 38 and being connected to the usual harness worn by the pilot. Arresting lines 19 also have their free ends attached to the straps 40.

*Operation of the embodiment of FIGS. 1–8 under low air speed conditions*

Assuming that the aircraft is at zero or low air speed, and recovery of the pilot becomes necessary, the pilot first releases seat belt 7 and, by operation of control wire 6, triggers firing of the projection charge of mounting and projection unit 1. Movement of handle 35 is avoided and stripping line 29 therefore remains retained by pin 33.

Figure 3:
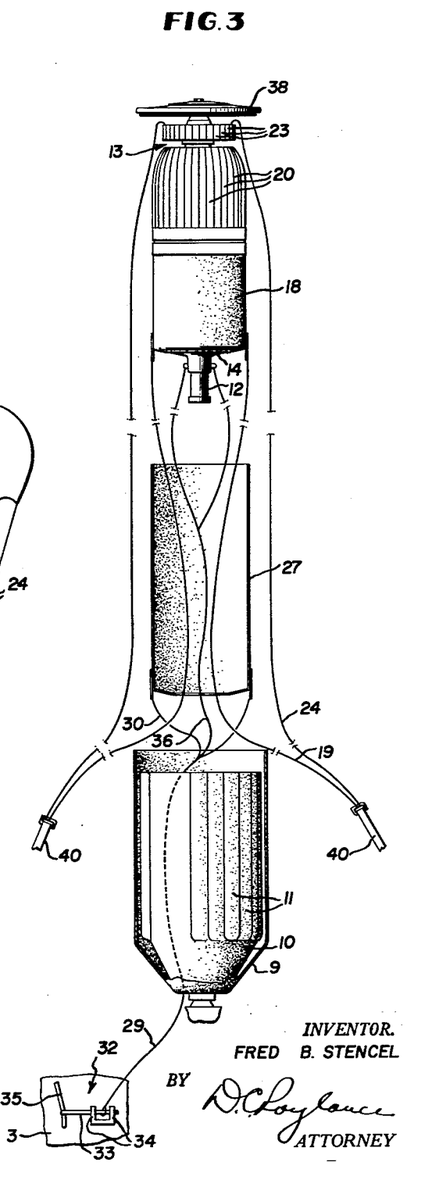
FIGS. 3 and 4 are elevational views illustrating operation of the parachute apparatus of FIGS. 1 and 2 under those conditions in which the load to be recovered has a low air speed.
Figure 4:
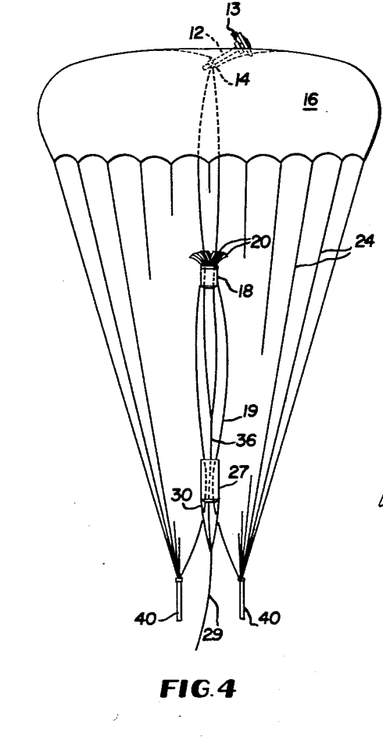
Figure 5:
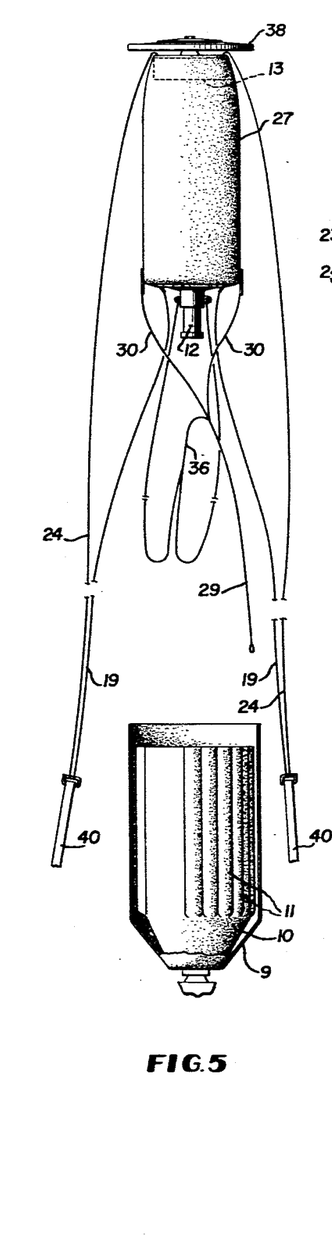
FIGS. 5-8 are elevational views similarly illustrating operation of the parachute apparatus of FIGS. 1 and 2 under high speed conditions.

Upon ignition of the projection charge, the expanding gases within projection tube 5 cause the assembly 2 to be projected in the fashion illustrated in FIG. 3. All elements of assembly 2 move upwardly, away from projection tube 5, outer bag 9 and line storage sleeve 10. Arresting lines 19 and suspension lines 24 pay out from pockets 11. Stripping line 29 being relatively short, it soon becomes taut, causing deployment-preventing member 27 to be stripped from the projection assembly well prior to actuation of deployment device 13. In this regard, it will be understood that the design parameters are made such that, as line 29 becomes taut and member 27 is stripped, the projected assembly is not sufficiently decelerated to cause firing of the deployment device when that device is equipped with an inertia-operated firing mechanism. Assembly 2 continues in its projected flight until arresting lines 19 become taut. As lines 19 tauten, assembly 2 is decelerated, causing the deployment device 13 to be fired. Since member 27 has been removed, projectiles 23 are free to fly radially outward relative to the line of travel of the assembly. Initial outer movement of the projectiles frees loops 26, allowing strips 20 to open, so that deployment of the canopy 16 can be effected. Due to its inertia, the projected assembly continues to move but, since the arresting lines are taut, canopy retaining bag 18 is stripped away. The projected flight of projectiles 23 continues and fold deployment results, as illustrated in FIG. 4, anti-coning line 36 becoming taut to limit the projected travel of elements 12, 13 and 14 at the apex of the canopy.

*Operation of the embodiment of FIGS. 1–8 under high air speed conditions*

Assuming now that the aircraft is travelling at high speed, and that it is desirable to recover the pilot, the pilot initiates operation of the parachute apparatus in precisely the same manner just described previously to or simultaneously with triggering of the projection charge, handle 35 is operated to slide pin 33 sufficiently to free and release stripping line 29. Again, outer bag 9 and line storage sleeve 10 remain with unit 1, the suspension and arresting lines paying out progressively from pockets 11. Projection thus occurs in the general fashion seen in FIG. 5, with deployment-preventing member 27 and stripping line 29 travelling with the projected assembly. As the flight of the assembly continues, arresting lines 19 become taut, decelerating the projected assembly and causing deployment device 13 to be fired. Projectiles 23 move outwardly away from housing 21, thus freeing loops 26 and opening the top of canopy bag 18, as seen in FIG. 6. However, since deployment-preventing member 27 remains in place, any substantial outward flight of the projectiles 23 is prevented.

Due to its inertia, the combination of tube 12, deployment device 13 and plate 14 continues to travel along the line of projection. Hence, arresting lines 19 being taut, canopy bag 18 is stripped away. Since deployment preventing member 27 is made in the nature of a sleeve, with its bottom end portion of reduced diameter and closely embracing the bottom end portion of the canopy bag, the deployment-preventing member 27 is stripped away with the canopy bag, as will be clear from FIG. 7. Such stripping away of both the canopy bag and the deployment-preventing member 27 frees the parachute canopy and projectiles 23.

Figure 8:
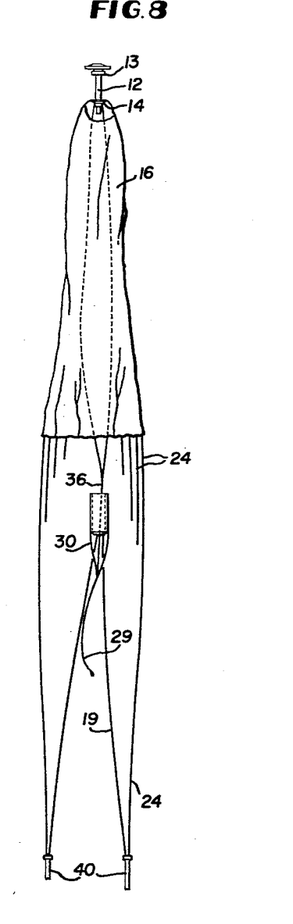

Continued travel of the combination of tube 12, deployment device 13 and plate 14 causes the parachute canopy to assume the elongated, unfilled, undeployed condition seen in FIG. 8, it being understood that the suspension lines 24, which are somewhat longer than arresting lines 19, now become fully payed out. Since the condition of operation being discussed is one of high air speed, the parachute canopy "streams" and, as the effective air speed of the pilot and the parachute apparatus decreases, the canopy is ultimately "filled" in the same manner as is well known in connection with conventional parachutes.

*Mount and projection unit, FIGS. 9–16*

Mount and projection unit 101 of the embodiment of FIGS. 9–16 is identical with that described with reference to FIGS. 1 and 2.

*Projected assembly, FIGS. 9–16*

In the projected assembly 102 of this embodiment, the projection tube, canopy, deployment device, canopy bag, arresting lines and suspension lines are constructed and arranged in precisely the same manner as described with reference to FIGS. 1–8. Here, however, the deployment preventing means comprises a plurality of restraining lines each connected to one of the deployment projectiles.

Figure 9:
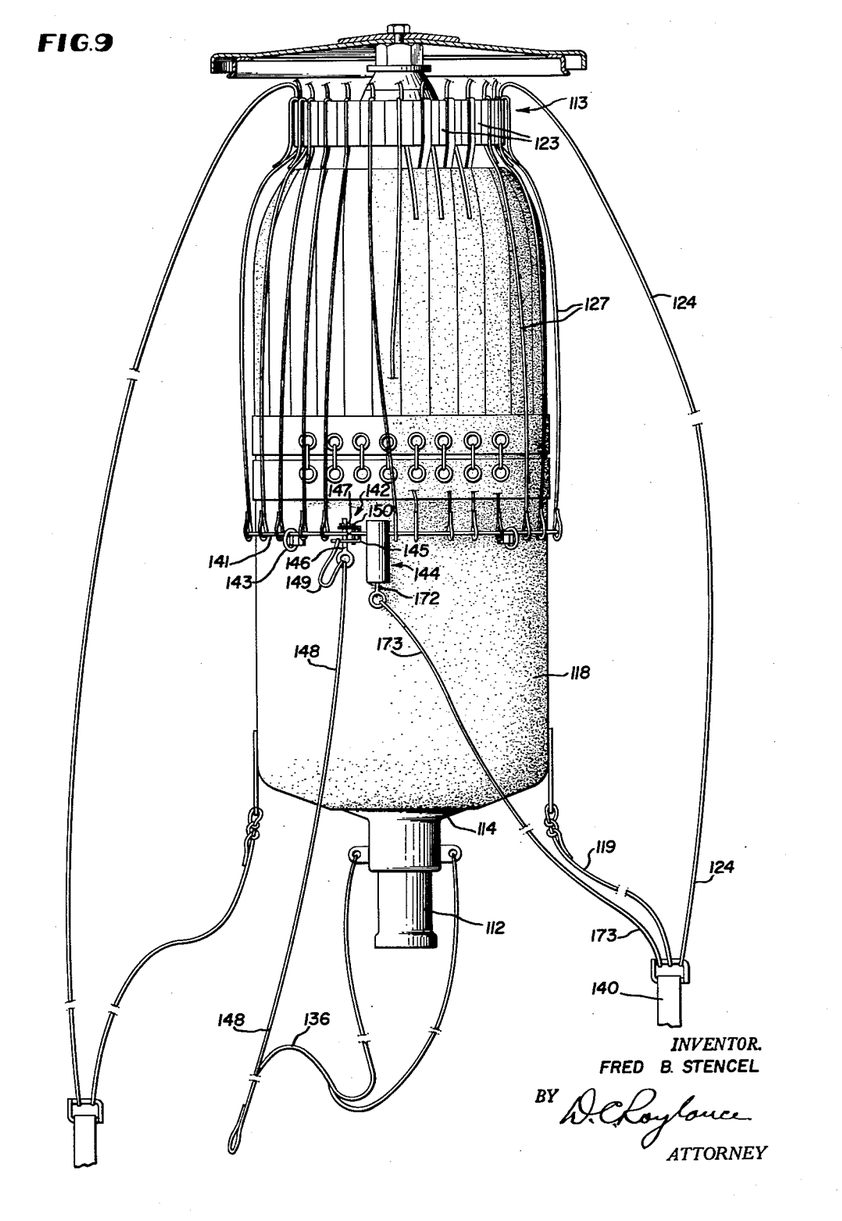
FIG. 9 is an elevational view of a parachute apparatus constructed in accordance with another embodiment of the invention.

Referring to FIG. 9, it will be seen that a plurality of restraining lines 127 of equal length are provided, one end of each restraining line being provided with a loop extending through a suitable bore in a different one of the deployment projectiles 123. Extending completely around the canopy bag 118 and lying in a plane transverse to projectile tube 112 is a retaining line 141, of cord or wire, the ends of which are releasably connected together by connector 142. The other end of each restraining line 127 is also provided with a loop, through all of which loops the retaining line 141 extends. Retaining line 141 is kept in position by a plurality of loops 143 attached to canopy bag 118. Retaining line 141 also extends through a cutting device 144, illustrated in FIG. 16 and hereinafter described in detail. So long as retaining line 141 remains in place, with its ends connected by connector 142, the travel of deployment projectiles 123 is limited by restraining lines 127. If, however, retaining line 141 is released, either by the action of cutter 144 or by opening connector 142, the lower ends of restraining lines 127 are then freed and projectiles 123 are therefore free to deploy the parachute canopy 116.

Connector 142 comprises a clevis 145, the arms of which are provided with a pair of openings accommodating a release pin 146. One end of line 141 is provided with a loop engaged over that portion of pin 146 disposed between the arms of the clevis. At its upper end, above the clevis, pin 146 is provided with a shear pin 147. At its lower end, below the clevis, pin 146 is provided with an eye to which is attached one end of a release line 148. Pin 146 is also connected to the clevis by a short cord 149. The remaining end of retaining line 141 is attached to a pin 150 fixed to the arms of the clevis.

Figures 10, 11, 12:
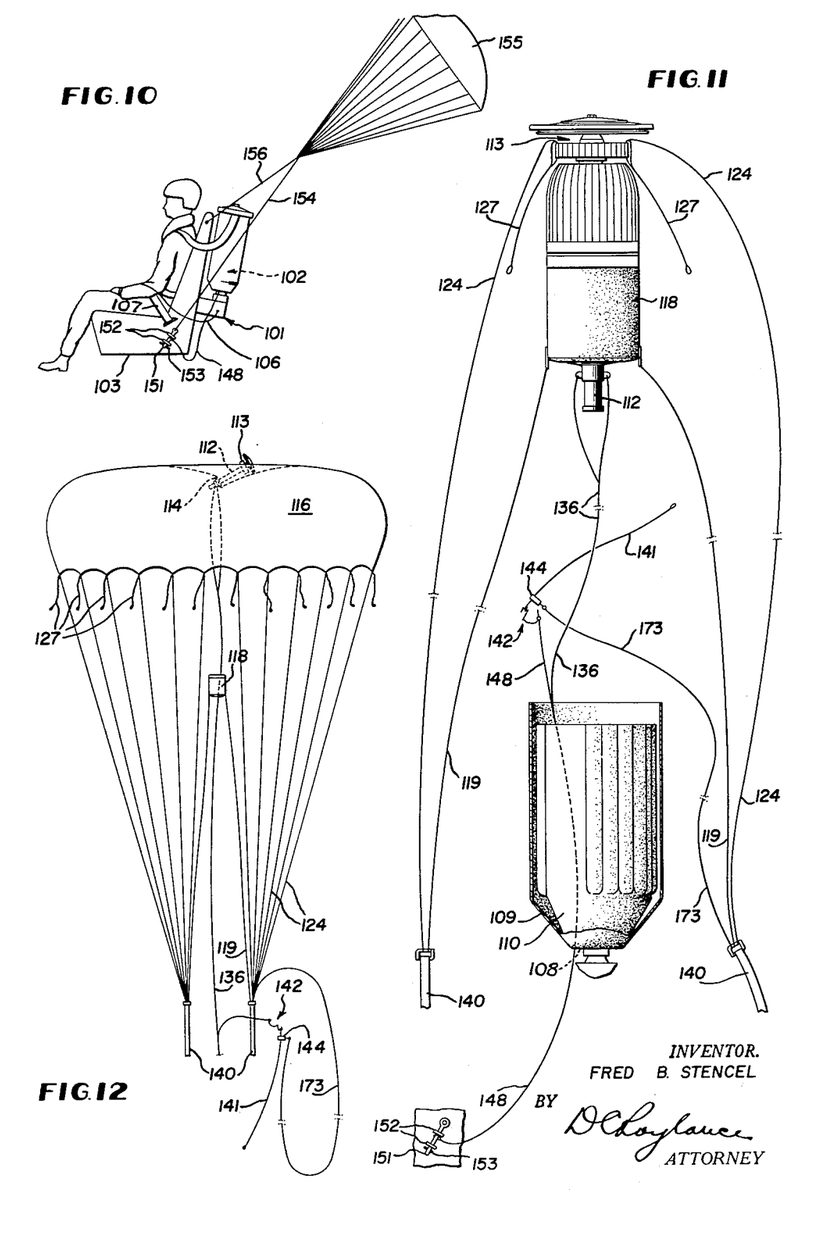
FIG. 10 is an elevational view illustrating such apparatus as applied to the problem of recovery of personnel in flight.
FIGS. 11 and 12 are elevational views illustrating operation of the apparatus of FIGS. 9 and 10 when the load to be recovered has a low air speed.

Release line 148 extends, through an opening in retaining plate 108, to the ejection seat 103 and is there provided with a loop through which extends a pin 151, FIGS. 10 and 11. Pin 151 extends through aligned openings in the spaced arms 152, and is provided at one end with a shear wire 153 and at the other end with an eye to which is attached a line 154 from a small stabilizing and air-speed sensing parachute 155. Parachute 155 is also connected to ejection seat 103 by lines 156, in the usual fashion. If, at the time of ejection, the air speed exceeds a value determined by the strength of shear wire 153, pin 151 will be withdrawn from arms 152, the shear wire breaking under the force applied by parachute 155, so that release line 148 is freed to travel with projected assembly 102. If, on the other hand, insufficient force is applied by parachute 155 to cause shearing of wire 153, pin 151 remains in place and secures release line 148 to the seat 103.

An anti-coning line 136 is connected between release line 148 and the canopy- and bag-retaining plate 114 mounted on projectile tube 112.

Figure 16:
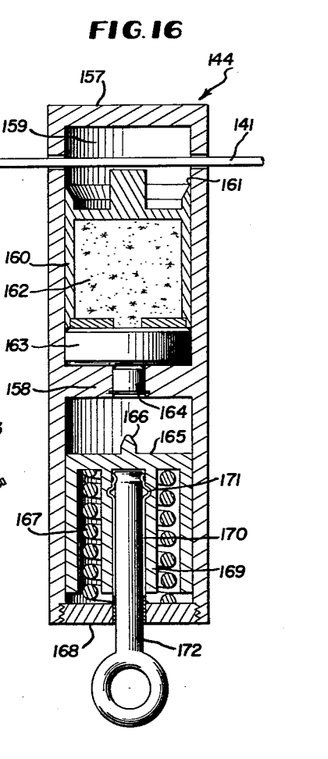
FIG. 16 is a detail sectional view, enlarged in scale, illustrating a retaining line cutting device employed in the apparatus of FIGS. 9 and 10.

As seen in FIG. 16, the retaining line cutter 144 comprises a cylindrical casing 157 divided into two chambers by a transverse partition 158. The portion of the cylindrical wall of casing 157 defining upper chamber 159 is provided with aligned laterally extending bores through which retaining line 141 extends. A hollow cutting member 160, generally in the form of a cylindrical cup, is slidably disposed in chamber 159 with its circular cutting edge 161 directed toward retaining line 141. Member 160 encloses a powder charge 162 and is seated on a time delay fuse container 163 disposed adjacent to partition 158. Partition 158 has a central opening in which is mounted the usual primer cap 164 for igniting the time delay fuse.

The cutter 144 employs a cylindrical firing pin 165 disposed in lower chamber 166 with its nose 166 aligned with cap 164, the firing pin being urged toward cap 164 by coil spring 167 located between the firing pin and an end plug 168 screwed into the bore of casing 157. At its center, firing pin 165 includes a sleeve 169 slidably engaged over a deformable, thin walled, retaining tube 170 secured to end plug 168, sleeve 169 having an internal transverse groove receiving an external transverse rib 171 on tube 170. End plug 168 is provided with a central opening through which extends a pin 172. Pin 172 has, at its tip, a transverse groove receiving an inwardly directed transverse rib on tube 170. The diameter of pin 172 is such that, when the pin is in place within tube 170, the tube cannot be deformed inwardly sufficiently to free its rib 171 from the groove in sleeve 169 of the firing pin. Hence, so long as pin 172 is in place, the firing pin is latched so that spring 167 cannot actuate it to explode primer cap 164. However, when pin 172 is withdrawn, the force of spring 167 is sufficient to cause sleeve 169 to be deformed inwardly, rib 171 being cammed out of the groove in sleeve 169, so that the firing pin is freed and snapped against cap 164 by the spring.

At its outer end, pin 172 is provided with an eye to which is attached one end of a lanyard 173, the other end of the lanyard being attached to one of the straps 140 to which the suspension lines 124 and arresting lines 119 are also attached. Lanyard 173 is of such length that, assuming connector 142 has not been actuated to released condition, pin 172 will be withdrawn by the lanyard at the time the arresting lines become taut and decelerate the projected assembly 102 to actuate deployment device 113.

Release line 148 is substantially shorter than arresting lines 119.

*Operation of embodiment of FIGS. 9–16 under low air speed conditions*

Assuming that the parachute is employed in connection with an aircraft capable of hovering flight and that it is necessary to recover the pilot P under conditions of zero or low air speed at low altitude, the pilot can cause ejection of seat 103 from the aircraft in the usual fashion and then simultaneously releases seat belt 107 and, by operation of control wire 106, triggers projection of assembly 102. At low air speed, there is not sufficient force on stabilizing parachute 155 to rupture shear wire 153 and the pin 151 accordingly remains in place in arms 152. Thus, at an early stage in the projected flight of assembly 102, well prior to actuation of deployment device 113, release line 148 becomes taut, withdrawing release pin 146 from the arms of clevis 145, and so freeing retaining line 141. Since release line 148 remains connected to clevis 145 by short cord 149 and the eye of pin 146, continued projected flight of assembly 102 causes retaining line 141 to be withdrawn from the loops 143 on the canopy bag and from the loops at the lower ends of the restraining lines 127. Accordingly, the restraining lines 127 now depend freely from projectiles 123. When arresting lines 119 become taut, the projected assembly is decelerated and explosive deployment device 113 is fired, projecting the deployment projectiles 123 radially outward to deploy the parachute canopy 116. Immediate, full deployment is attained as illustrated in FIG. 12, since the bottom ends of restraining lines 127 are now unattached.

Depending upon the type of aircraft involved and the specific nature of seat 103, it may not be necessary or desirable to accomplish ejection of the seat and such action does not affect operation of the parachute apparatus since, in any event, pin 151 will remain in place to anchor the end of release line 148 to the seat.

*Operation of embodiment of FIGS. 9–16 under high air speed conditions*

Assuming that recovery of the pilot is necessary under conditions of high air speed, the pilot accomplishes ejections of seat 103 in conventional fashion and, since the air speed is high, the parachute 155 both stabilizes the seat in upright position and applies a sufficient force on line 154 to rupture shear wire 153 and withdraw pin 151 from arms 152, so freeing release line 148 to travel with assembly 102. The pilot releases seat belt 107 and, by operation of control wire 106, triggers explosive projection of assembly 102.

Figures 13, 14:
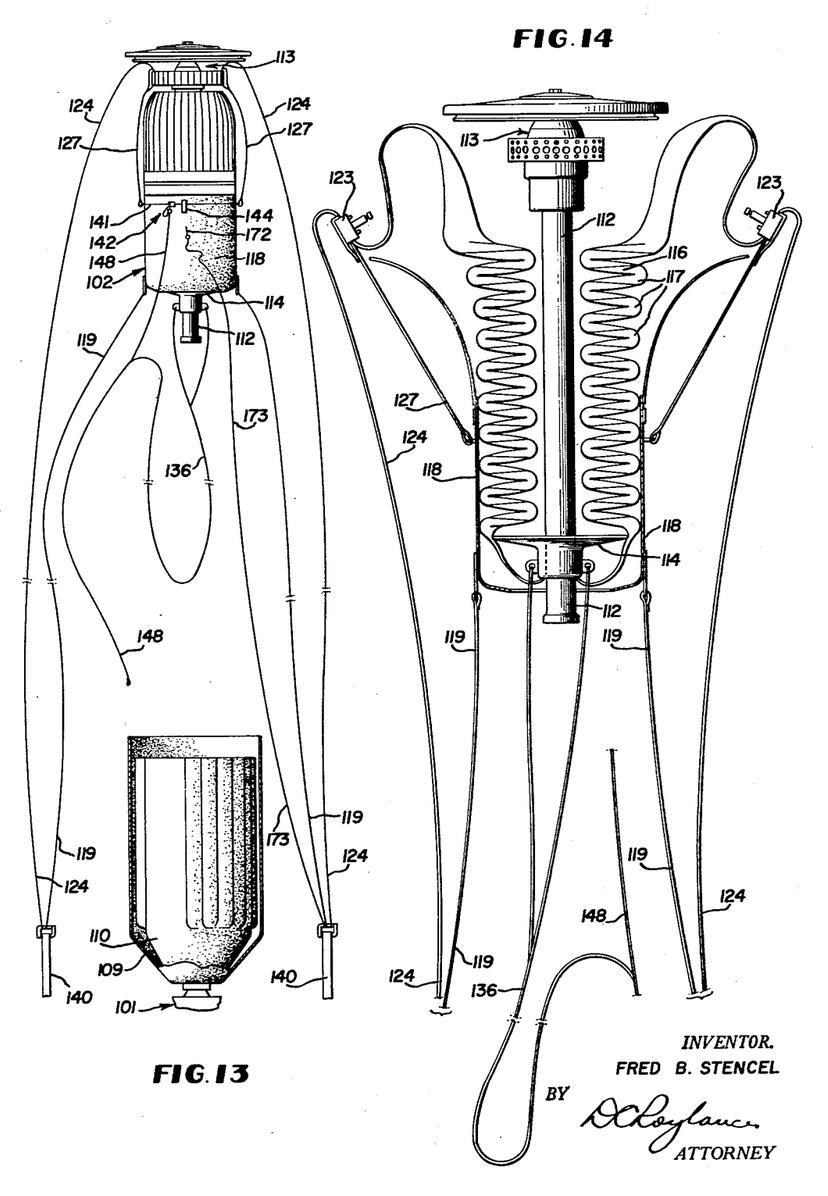
FIGS. 13–15 are elevational views illustrating operation of the apparatus of FIGS. 9 and 10 under high air speed conditions.
Figure 15:
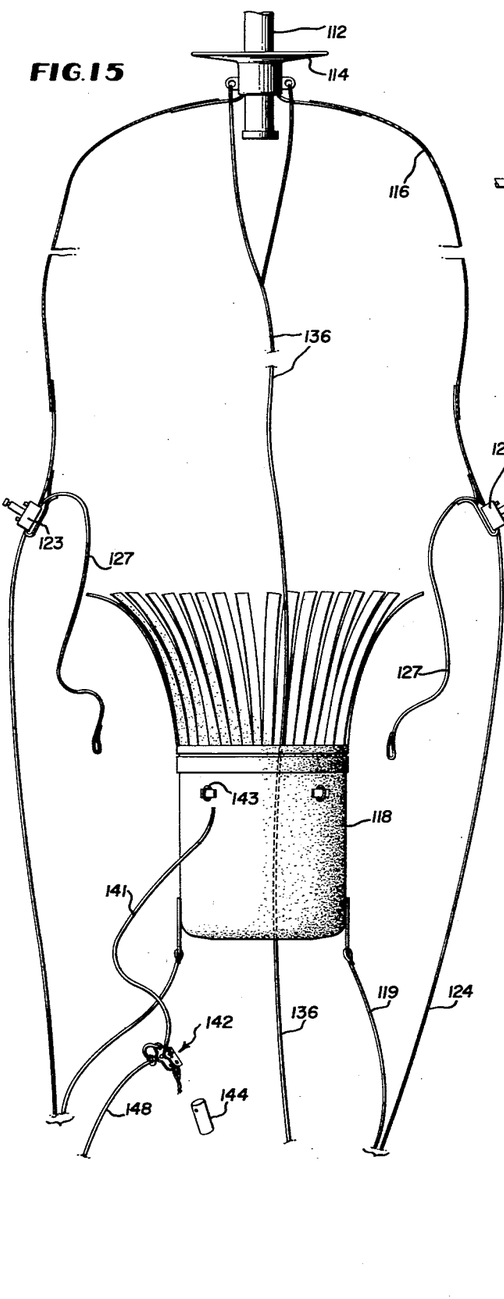

As illustrated in FIG. 13, assembly 102 continues its travel, with retaining line 141 in place, until arresting lines 119 are payed out and taut. At this point lanyard 173 also becomes taut, causing pin 172, FIG. 16, to be withdrawn, firing pin 165 of cutting device 144 thus being unlatched and, by action of spring 167, thrown against cap 164 to explode the same, causing ignition of the time delay fuse in container 163.

Tautening of arresting lines 119 causes the explosive charge of deployment device 113 to be ignited, so that deployment projectiles 123 are thrown radially outward with respect to the line of projected flight of assembly 102. At this time, however, retaining line 141 is still in place, connector 142 being not released and, because of the time delay fuse, cutting device 144 having not yet operated to cut the retaining line. Hence, restraining lines 127 are all still tied to the projected assembly. Accordingly, deployment projectiles 123 are each "tied down" and caused to travel a short downward arc, the radius of which is determined by the length of the restraining lines 127. The length of such arc of travel is sufficiently small that no deployment of canopy 116 occurs.

Since the deployment charges are projected outwardly with considerable force, sufficient to fully deploy the canopy were the restraining lines 127 not still connected to the retaining line 141, their arcuate movement involves substantial kinetic energy. Considering FIG. 14, it will be seen that the projected assembly 102 is attached to one end of all of the restraining lines, and that the restraining lines are all taut. Hence, a substantial proportion of the energy involved in downward movement of deployment projectiles 123 is now imparted to the combination of elements 112, 113 and 114, aiding the travel of such combination in the direction of projection thereof.

Toward the end of the downward arcuate movement of the projectiles 123, or at a delay time sufficient to decelerate the seat to a velocity which is safe for parachute inflation, the time delay fuse ignites charge 162, causing cutting member 160 to move in chamber 159 and sever retaining line 141, freeing restraining lines 127 and therefore freeing deployment projectiles 123.

The top of canopy bag 118 having been opened upon actuation of the deployment device, and arresting lines 119 being taut, with the combination of tube 112, deployment device 113 and plate 114 being still in projected flight, the canopy bag is stripped away. Canopy 116 now "streams" and is allowed to "fill" in the usual manner, as will be apparent from FIG. 15.

While, in the embodiment just described, a time delay fuse is employed to accomplish actuation of the retaining line cutter at an appropriate time after firing of the explosive deployment device, it will be understood that the same results can be achieved by other means.

It will be noted that the combination of the small stabilizing parachute 155, line 154, pin 151, retaining arms 152 and shear wire 153 constitute a release means, for release line 148, such release means acting in response to air speed. It will be understood that various other means can be employed to accomplish automatic freeing of the release line 148 under high air speed conditions. Thus, for example, means for sensing dynamic pressure, and thus air speed, or means for sensing deceleration, can be employed.

As previously indicated, both the embodiment of FIGS. 1-8 and that of FIGS. 9-16 employ an explosively powered deployment device which can advantageously be constructed in the manner described in my aforementioned Patent Number 2,953,333. As illustrated in FIG. 17, the explosive deployment charge 175 is arranged in housing 21 in such fashion as to be ignited by a primer 176, the primer being detonated by a firing pin 177 slidably disposed in a bore through the bottom wall of housing 21. Depending from housing 21 is a housing member 178 which is threadedly connected to the leading end of projectile tube 12 (FIG. 1) or 112 (FIG. 9). Thus, member 178 rigidly mounts housing 21 on the projectile tube and also provides an enclosed chamber 179 to accommodate the inertia actuated operator for firing pin 177.

Within chamber 179 is an actuating plunger 180 mounted in alignment with firing pin 177 for movement toward and away from the firing pin generally in the direction of the line of flight of the projected assembly. A plurality of radially extending telescopic spring housings 181 are provided, each pivoted at one end to plunger 180 and at the other end to a ring 182 fixed to members 21 and 178. In each of the telescopic housings 181 there is enclosed a compression spring. A stop shoulder 183 is carried by member 178 below the spring housings 181, and plunger 180 has a cooperating stop shoulder 184. Thus, plunger 180 can be moved downwardly until shoulders 183 and 184 are in engagement, and the springs in housings 181 will resiliently bias the plunger to that position. However, when, in the flight of the projected assembly, the arresting lines 19 (FIG. 1) or 119 (FIG. 9) become taut, the assembly is decelerated to such an extent that the downward resilient biasing effect of the springs in housings 181 is overcome, allowing plunger 180 to snap upwardly against firing pin 177, with the result that the firing pin detonates primer 176 and the deployment charge 175 is ignited. FIG. 17 illustrates the device in that condition which occurs just after ignition of the deployment charge, the explosion gases having produced a pressure adequate to outwardly deform the thin metal cylindrical wall of the charge retainer 185, so that the explosion gases are released suddenly to pass, via ducts 186, simultaneously into all of the bores 22. Thus, all of the projectiles 23 are discharged simultaneously in response to deceleration of the projected assembly.

I claim:
1. In a power operated parachute apparatus capable of operation both at low air speeds, with power deployment, and at high air speeds, without power deployment, the combination of a projected assembly comprising a support, a parachute canopy disposed on said support in folded relation, power actuated deployment means mounted on said support and operatively connected to said canopy to deploy the same; time delay actuating means operatively associated with said deployment means to actuate the same after said assembly has been projected; power actuated projection means operatively associated with said assembly to project the same; deployment preventing means normally operative to prevent deployment of said canopy when said deployment means is actuated, and means connected to said deployment preventing means and operative to render the same ineffective in order that said canopy can be deployed by said deployment means.

2. A parachute apparatus in accordance with claim 1 and wherein said deployment means comprises a plurality of deployment projectiles attached to said canopy and means for projecting said projectiles radially outward from the line of projection of said assembly, said deployment preventing means comprising an annular flexible member surrounding said deployment means and operative to restrain said projectiles after their projection.

3. A parachute apparatus in accordance with claim 2 and wherein said means operative to render said deployment preventing means inoperative comprises an arresting line connected to said flexible member, and selectively operable means whereby said arresting line can be secured, in order to effect stripping of said flexible member from its operative position, and released, in order to avoid such stripping.

4. A parachute apparatus in accordance with claim 1 and wherein deployment means comprises a plurality of deployment projectiles attached to said canopy and means for projecting said projectiles radially outward from the line of projection of said assembly, said deployment preventing means comprising a plurality of restraining lines attached each between a point on said assembly exterior to said folded canopy and a different one of said projectiles.

5. A parachute apparatus in accordance with claim 4 and further comprising an annular member embracing said assembly and extending transversely relative to the direction of projection thereof, one end of each of said restraining lines being attached to said annular member.

6. A parachute apparatus in accordance with claim 1 and including release means responsive to air speed of the load to be recovered, said release means being connected to said means operative to render said deployment preventing means ineffective.

7. In a parachute apparatus of the type comprising a projected assembly including a support, a parachute canopy disposed on the support in folded relation, and explosively actuated deployment means mounted on the support and including a plurality of laterally directed deployment projectiles operatively connected to the canopy; time delay actuating means operatively associated with the deployment means to actuate the same after the projected assembly has been projected, and power actuated projecting means operatively associated with the projected assembly to project the same, the combination of a flexible annular deployment-preventing member carried by the projected assembly and surrounding the deployment projectiles to limit the travel thereof, said deployment-preventing member being capable of being stripped from the projected assembly; a stripping line attached to said deployment-preventing member, and releasable means for attaching said stripping line to a stationary point at the location of the projecting means, said stripping line being of such length that, when so attached by said releasable means, said stripping line will become taut and strip said deployment-preventing member from the projected assembly during the projected flight of the latter and prior to actuation of the deployment means.

8. A parachute apparatus in accordance with claim 7 and further comprising an anti-coning line connected between said stripping line and the apex of the parachute canopy.

9. A parachute apparatus in accordance with claim 7 and wherein said deployment-preventing member is a generally cylindrical fabric sleeve embracing the projected assembly, said sleeve having a leading edge portion embracing the deployment projectiles, said stripping line being attached to the trailing edge portion of said sleeve.

10. In a parachute apparatus of the type comprising a projected assembly including a support, a parachute canopy disposed on the support in folded relation, and explosively actuated deployment means mounted on the support and including a plurality of laterally directed deployment projectiles operatively connected to the canopy; time delay actuating means operatively associated with the deployment means to actuate the same after the projected assembly has been projected, and power actuated projecting means operatively associated with the projected assembly to project the same, the combination of a retaining line encircling the projected assembly at a point spaced from the deployment projectiles, a plurality of restraining lines each connected to a different one of the deployment projectiles and releasably connected to said retaining line, and means for effecting release of said restraining lines from said retaining line.

11. A parachute apparatus in accordance with claim 10 and wherein each of said restraining lines is provided with an end loop, through which loops said retaining line extends, and said means for effecting release of said restraining lines includes a cutting device for severing said retaining line.

12. A parachute apparatus in accordance with claim 11 and wherein a releasable connector is provided in said retaining line, said apparatus further comprising a release line operatively connected to said connector to release the same and thereby free said retaining line to release said restraining lines.

13. A parachute apparatus in accordance with claim 12 and further comprising an anti-coning line connected between said release line and the apex of the parachute canopy.

14. In a power operated parachute apparatus capable of operation both at low air speeds, with power deployment, and at high air speeds, without power deployment, the combination of a projected assembly comprising a support, a parachute canopy disposed on said support in folded relation, power actuated deployment means mounted on said support and operatively connected to said canopy to deploy the same; time delay actuating means operatively associated with said deployment means to actuate the same after said assembly has been projected; power actuated projection means operatively associated with said assembly to project the same; deployment preventing means operative to prevent deployment of said canopy when said deployment means is actuated, and selectively operable means whereby said deployment preventing means can be rendered operative, so preventing power deployment of said canopy by said deployment means, and ineffective, so allowing such power deployment.

References Cited in the file of this patent
UNITED STATES PATENTS

| | | |
|---|---|---|
| 1,081,137 | Von Augezd | Dec. 9, 1913 |
| 2,732,153 | Frieder et al. | Jan. 24, 1956 |